Jan. 12, 1926.  
J. F. SMART  
ELECTRICALLY HEATED DEVICE  
Filed August 11, 1923  
1,569,241

Inventor  
Joseph F. Smart  
By T. Clay Lindsey  
His Attorney

Patented Jan. 12, 1926.

1,569,241

UNITED STATES PATENT OFFICE.

JOSEPH FREDERICK SMART, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICALLY-HEATED DEVICE.

Application filed August 11, 1923. Serial No. 656,869.

*To all whom it may concern:*

Be it known that I, JOSEPH FREDERICK SMART, a citizen of the United States, and a resident of New Britain, county of Hartford, State of Connecticut, have invented certain new and useful Improvements in an Electrically-Heated Device, of which the following is a specification.

This invention relates to electrically heated devices, for instance sad irons, and has as its aim to provide devices of this sort with means arranged in a novel and advantageous manner for cutting off the circuit through the heating element when the device reaches a predetermined or dangerous degree of heat.

In accordance with the present invention, the means for breaking the current, which, by way of example, is shown as being in the form of a thermostat, is positioned where it has the greatest effectiveness, in the embodiment shown it being positioned within the sole plate at the central portion thereof where the heat may be most closely regulated, thus insuring that the thermostat will uniformly operate when the device reaches the predetermined degree of temperature at which it is desired to throw the circuit off the heating element. The cut-off device is not connected directly in the heating element, as it is desired not to break this element, but in the leads for the heating element, and the arrangement and connections are such that the parts of the device may be very readily assembled and disassembled, it being possible to get at the connections leading to the thermostat without disturbing the heating unit or the thermostat. The arrangement is very simple and economical.

The above and other objects of the invention are obtained in the structure illustrated in the accompanying drawing, wherein I have shown, by way of exemplification only, one form or embodiment which the invention may take, it being understood, however, that the invention is susceptible of various modifications and changes which would be within the spirit of the invention without departing from the scope of the appended claim.

Figure 1:
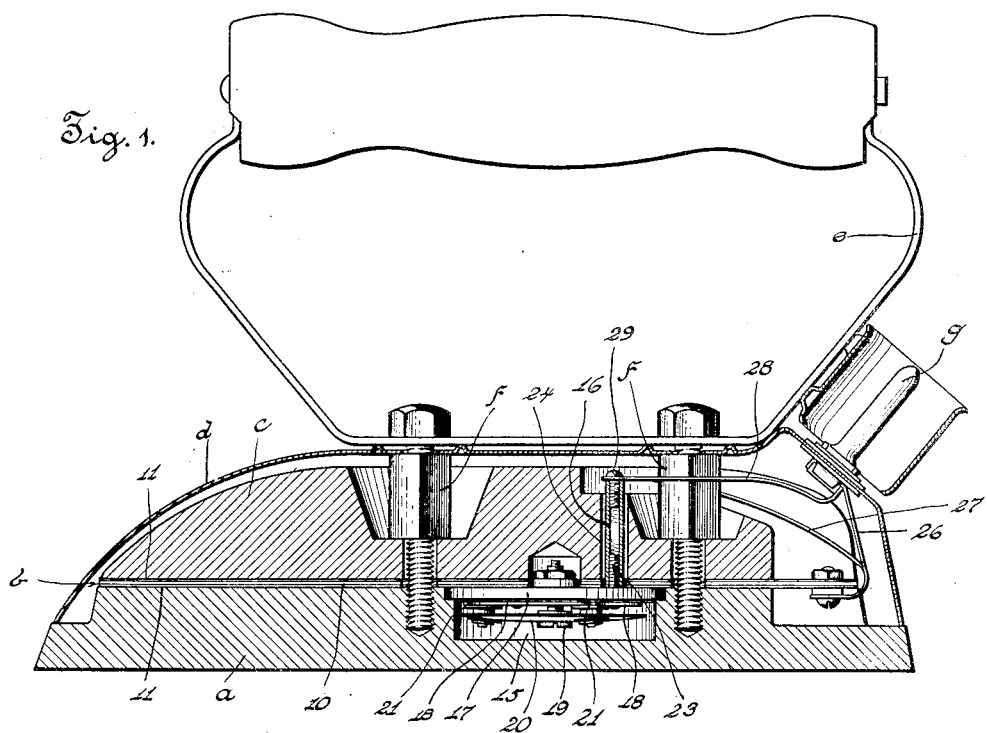
Figure 2:
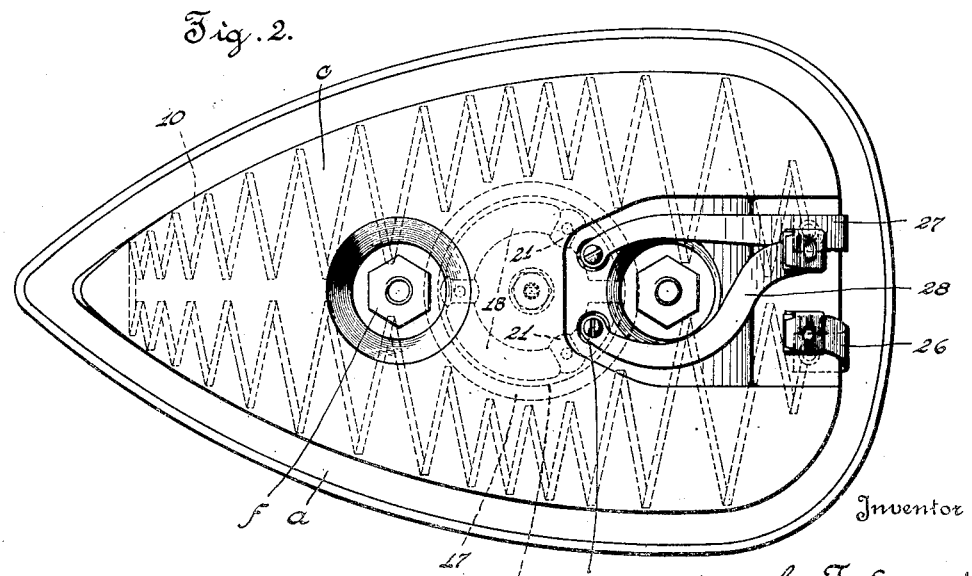

In this drawing:

Figure 1 is a vertical sectional view taken longitudinally through a sad iron in which my improvements are embodied; and Fig. 2 is a top plan view with the cover removed.

Referring to the drawing in detail, $a$ designates a plate to be heated which plate, in the present instance, constitutes the sole of a sad iron. $b$ denotes generally an electrical heating unit which may be of any suitable or desired construction but which is here shown, by way of example, as consisting of a heating element or wire 10 positioned between insulating or mica sheets 11. $c$ is a clamping plate or weight between which and the hot plate $a$, the electrical heating unit $b$ is positioned. $d$ is a cover, and $e$ is a handle. The foregoing parts may be secured or clamped together in any approved manner as, for instance, by the securing means designated generally by the letter $f$. $g$ designates terminal posts to which the respective ends of the heating element are connected by means of suitable leads described hereinafter more in detail.

In accordance with the present invention, there is provided a circuit breaker or cut-out device positioned within or supported by the hot or sole plate $a$, this cut-out device being electrically interposed, by suitable connections extending through the heating unit and the weight, in one of the leads from the heating unit to one of the terminal posts. As will be seen from the drawing, the cut-out device, which may be of any suitable construction, is located within a recess 15 provided in the upper face of the sole plate $a$ and at the central portion thereof. The thermostat is connected in one of the leads by connectors 16 which extend upwardly through the heating unit and the weight. The cut-out device is here shown, by way of example only, as having a supporting plate 17 carrying on its bottom face insulated and spaced apart metal strips or segments 18. Secured to the supporting plate, as by means of a screw 19, is a thermostatic element in the form of a dished or curved disk 20 which carries insulated circuit closers or buttons 21 adapted to close all but one of the gaps between the adjacent segments 18. Normally, the buttons 21 are in engagement with the segments but, should the device be heated up to a predetermined temperature, the disk 20 will tend to flatten out and thereby withdraw the circuit closers from the segments and thus break the circuit. Electrically connected to the two end segments 18, the gap between which is not closed by any circuit closer, and by means of the screws 23, for instance, are connectors 16. These connectors may be in the form of small tubes threaded at their opposite ends and extending upwardly through the heating unit and through openings 24 in the weight $c$. One end of the heating element 10 is directly connected to one of the posts $g$ by a lead 26. The thermostat is interposed in the other lead which includes a strip 27 connected to the opposite end of the heating element and to one of the connectors 16, and a second strip 28 connected to the other connector 16 and the other post $g$. The strips 27 and 28 are connected to the members 16 by means of screws 29.

It will be seen that, with the arrangement described, the circuit closers 21 are normally in engagement with the segments 18, and the current will flow, for instance, through the lead 26, the heating element, the strip 27, one of the connectors 16, through the contacting segments and circuit closers 18 and 21, respectively, to the other connector 16 and through the strip 28 to the other terminal post. When the iron reaches a predetermined temperature at which it is desired to break the circuit, the disk 20 will have flattened out to such an extent that the circuit closers, or at least some of them, are withdrawn from the segments, thereby breaking the circuit therebetween and cutting off the current through the unit. When the iron again cools off, the disk 20 will assume its normal condition, again bringing the circuit closers into engagement with the segments 18, thus closing the circuit.

It will be observed that the cut-off device is located within the iron at that place at which it will operate with the most uniformity. The thermostat is not interposed in the heating element itself, a feature which is of advantage as there are objections to interrupting or breaking this element. Also, if, for any reason, it is desired to disassemble the iron, this may be very readily done.

I claim as my invention:

In a device of the character described, a sole plate having a centrally disposed recess, a weight, a heating element interposed between said weight and sole plate, terminals, leads from said terminals to the respective ends of said heating element, a thermal circuit breaker removably positioned in said recess, tubular connectors extending through said weight, screws for securing the lower ends of said connectors to said breaker, and screws for connecting the upper ends of said connectors in one of said leads.

JOSEPH F. SMART.